US009994226B2

(12) United States Patent
Dudar

(10) Patent No.: US 9,994,226 B2
(45) Date of Patent: Jun. 12, 2018

(54) SYSTEMS AND METHODS FOR ACTIVE ENGINE MOUNT DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/351,314

(22) Filed: Nov. 14, 2016

(65) Prior Publication Data

US 2018/0134301 A1 May 17, 2018

(51) Int. Cl.
| B60W 30/00 | (2006.01) |
| B60W 30/20 | (2006.01) |
| F02D 41/30 | (2006.01) |
| F02D 41/00 | (2006.01) |
| F02D 41/26 | (2006.01) |
| B60W 10/06 | (2006.01) |
| B60W 10/184 | (2012.01) |

(52) U.S. Cl.
CPC ............ B60W 30/20 (2013.01); B60W 10/06 (2013.01); B60W 10/184 (2013.01); F02D 41/008 (2013.01); F02D 41/26 (2013.01); F02D 41/3005 (2013.01); B60W 2030/206 (2013.01); B60W 2710/0616 (2013.01)

(58) Field of Classification Search
CPC .... B60W 30/20; B60W 10/06; B60W 10/184; B60W 2030/206; B60W 2710/0616; F02D 41/008; F02D 41/26; F02D 41/3005; F16F 15/02; G05D 19/02

USPC .............................. 701/48; 267/140.15, 141
See application file for complete search history.

(56) References Cited

U.S. PATENT DOCUMENTS

| 5,313,407 | A | 5/1994 | Tiernan et al. |
| 6,361,031 | B1 | 3/2002 | Shores et al. |
| 8,296,103 | B2 | 10/2012 | Son et al. |
| 8,347,856 | B2 | 1/2013 | Leone et al. |
| 9,365,218 | B2 | 6/2016 | Pallett et al. |
| 2001/0032919 | A1* | 10/2001 | Hagino .................. F16F 13/264 248/562 |
| 2003/0098533 | A1* | 5/2003 | Nishi .................... F16F 13/262 267/140.11 |
| 2004/0188899 | A1* | 9/2004 | Ichikawa .............. F16F 13/264 267/140.3 |
| 2010/0082274 | A1* | 4/2010 | Son ......................... G01H 1/00 702/56 |
| 2012/0049424 | A1 | 3/2012 | Bradshaw et al. |

(Continued)

*Primary Examiner* — Marthe Y Marc-Coleman
(74) *Attorney, Agent, or Firm* — Julia Voutvras; McCoy Russell LLP

(57) ABSTRACT

Methods and systems are provided for diagnosing whether active engine mounts configured to isolate engine vibration from a cabin and chassis of a vehicle are functioning as desired. In one example, engine vibrations are actively induced, and the active engine mounts are alternately controlled to a first, dampening mode, and to a second, stiffening mode for predetermined time periods, where resultant chassis vibrations are monitored during the predetermined time periods. By monitoring chassis vibrations as a function of induced engine vibrations, and further responsive to the active engine mounts being controlled to the first and second modes, it may be indicated as to whether the active engine mounts are functioning as desired.

17 Claims, 7 Drawing Sheets

(56) References Cited

U.S. PATENT DOCUMENTS

2015/0100221 A1* 4/2015 Routledge ............... F01N 1/165
            701/111
2017/0152911 A1* 6/2017 Kim ..................... F16F 13/107

* cited by examiner

FIG. 6

Vibrations correlated with degraded combustion events?

|   | 1st mode | 2nd mode | 1st mode | Diagnosis |
|---|---|---|---|---|
| A | No | Yes | No | Active mounts functioning as desired |
| B | No | No | No | Active mounts stuck in first mode |
| C | Yes | Yes | Yes | Active mounts stuck in second mode |

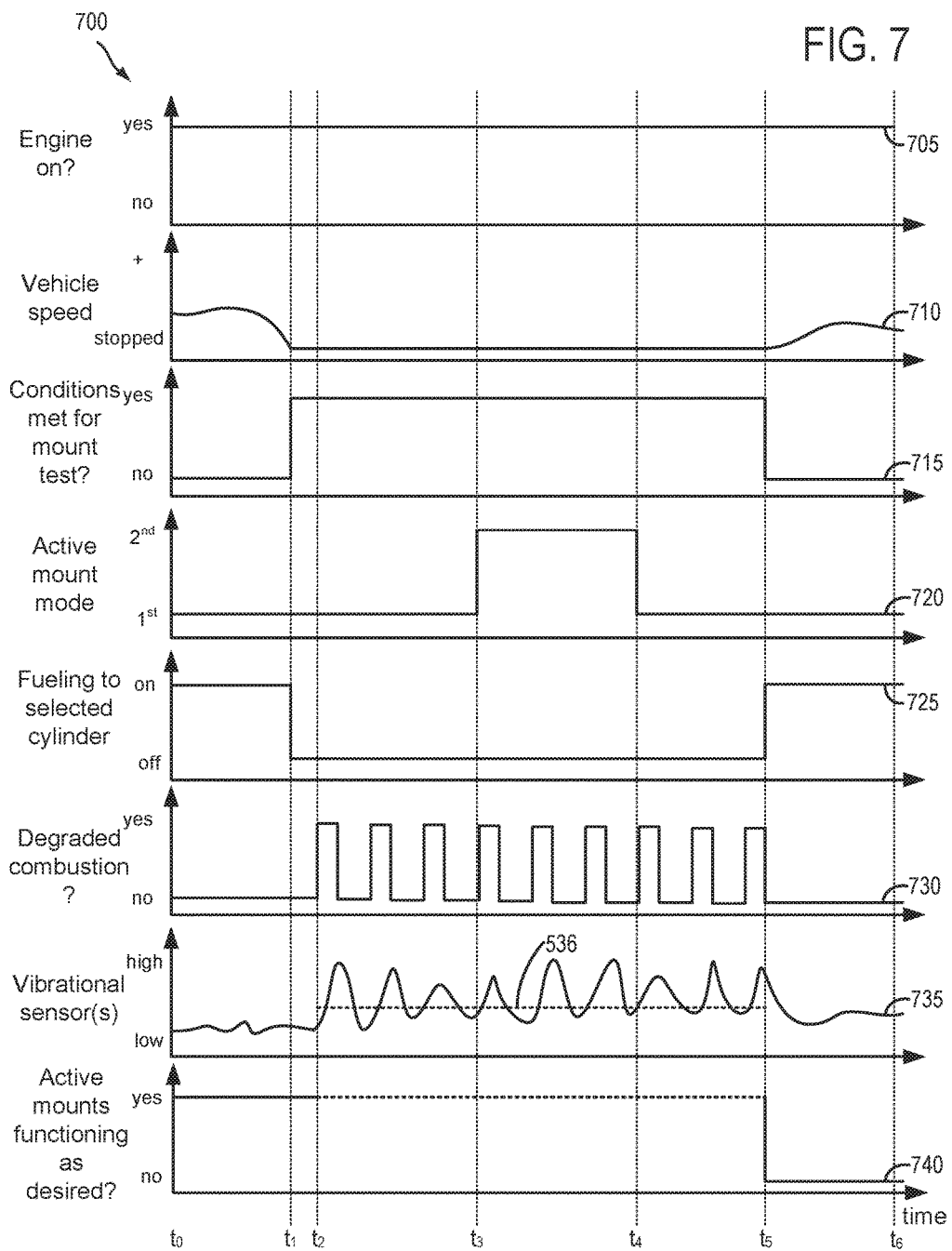

SYSTEMS AND METHODS FOR ACTIVE ENGINE MOUNT DIAGNOSTICS

FIELD

The present description relates generally to methods and systems for controlling a vehicle engine to induce degraded combustion events to diagnose whether active engine mounts are functioning as desired.

BACKGROUND/SUMMARY

Engines historically have had solid rubber mounts to isolate engine vibration from the vehicle cabin and chassis, where the rubber naturally absorbed vibrations from the engine. However, in performance and high end cars, if rubber is too compliant, then certain vehicle maneuvers may cause high loads, and this may stress joints in the vehicle, for example in the exhaust system. Hence, tunable active engine mounts have been developed that may be controlled to change dampening characteristics depending on engine load.

As an example, the active engine mounts may be configured to be soft at engine idle to absorb undesired vibrations. However, at higher engine speeds, the active engine mounts may be configured to stiffen, to limit undesired engine motion, which may prevent stress on exhaust joints, for example. Accordingly, active engine mounts may achieve low noise, vibration, and harshness (NVH) at idle, and may further reduce NVH and prevent undesired stress at high loads.

For vehicles where a vehicle operator is typically operating the vehicle, the vehicle operator or other passengers in the vehicle may experience undesired NVH during certain vehicle conditions, which may result in the vehicle operator taking the vehicle to a repair shop such that a diagnosis can be made as to the source of the undesired NVH. However, there may be cases where a vehicle operator does not recognize the undesired NVH in a timely fashion to prevent vehicle complications arising from the undesired NVH. Furthermore, there may be instances, such as in the case of autonomously driven vehicles (AV), where a vehicle or passenger may not be present to observe undesired NVH. Thus, in such an example, as well as in examples where a vehicle operator may be present, it may be desirable to periodically conduct a diagnostic test as to whether the active engine mounts are functioning as desired.

The inventors herein have recognized these issues, and have developed systems and methods to at least partially address the above issues. In one example, a method is provided, comprising during propelling a vehicle at least in part by an engine, isolating engine vibration from a cabin and chassis of the vehicle via one or more active engine mounts controllable to a first mode and a second mode; and in a first condition, increasing engine vibrations and controlling the active engine mounts to the first mode and the second mode to diagnose whether the active engine mounts are functioning as desired.

As an example, the method may include providing fuel to one or more engine cylinders via controlling one or more fuel injectors during propelling the vehicle at least in part by the engine; and wherein inducing engine vibrations includes shutting off fueling to a preselected engine cylinder to induce degraded combustion in the preselected engine cylinder.

In one example, the method may include determining whether vibrations stemming from the vehicle cabin and chassis as monitored via one or more vibrational sensors correlate with the increased vibrations during controlling the active engine mounts to the first mode and the second mode during the first condition. The method may thus include indicating the active engine mounts are functioning as desired responsive to monitored vibrations not correlating with increased vibrations in the first mode, but where monitored vibrations are correlated with the increased vibrations in the second mode. In another example, the method may include indicating the active engine mounts are stuck in the first mode responsive to monitored vibrations not correlating with the increased vibrations in the first mode, but where monitored vibrations are correlated with the increased vibrations in the second mode. In still another example, the method may include indicating the active engine mounts are stuck in the second mode responsive to monitored vibrations correlating with the increased vibrations in the first mode, and where monitored vibrations are also correlated with the increased vibrations in the second mode.

As an example, determining whether vibrations stemming from the vehicle cabin and chassis as monitored via the one or more vibrational sensors correlate with the increased vibrations further comprises indicating that the vibrations monitored via the one or more vibrational sensors correlate with the increased vibrations responsive to the monitored vibrations being above a threshold vibration level within a time threshold of the increased vibrations. In this way, a vehicle's active engine mounts may be diagnosed periodically, even under conditions wherein the vehicle is being driven autonomously, for example. By diagnosing the vehicle active engine mounts periodically even under conditions where a vehicle operator may not be present, complications stemming from active engine mounts that are not functioning as desired may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows an example lookup table for diagnosing whether active engine mounts are functioning as desired, where the table is utilized as a part of the method depicted in FIG. 5.

FIG. 7 depicts an example timeline for conducting the active engine mount test diagnostic procedure, according to the method depicted in FIG. 5.

DETAILED DESCRIPTION

Figure 2:
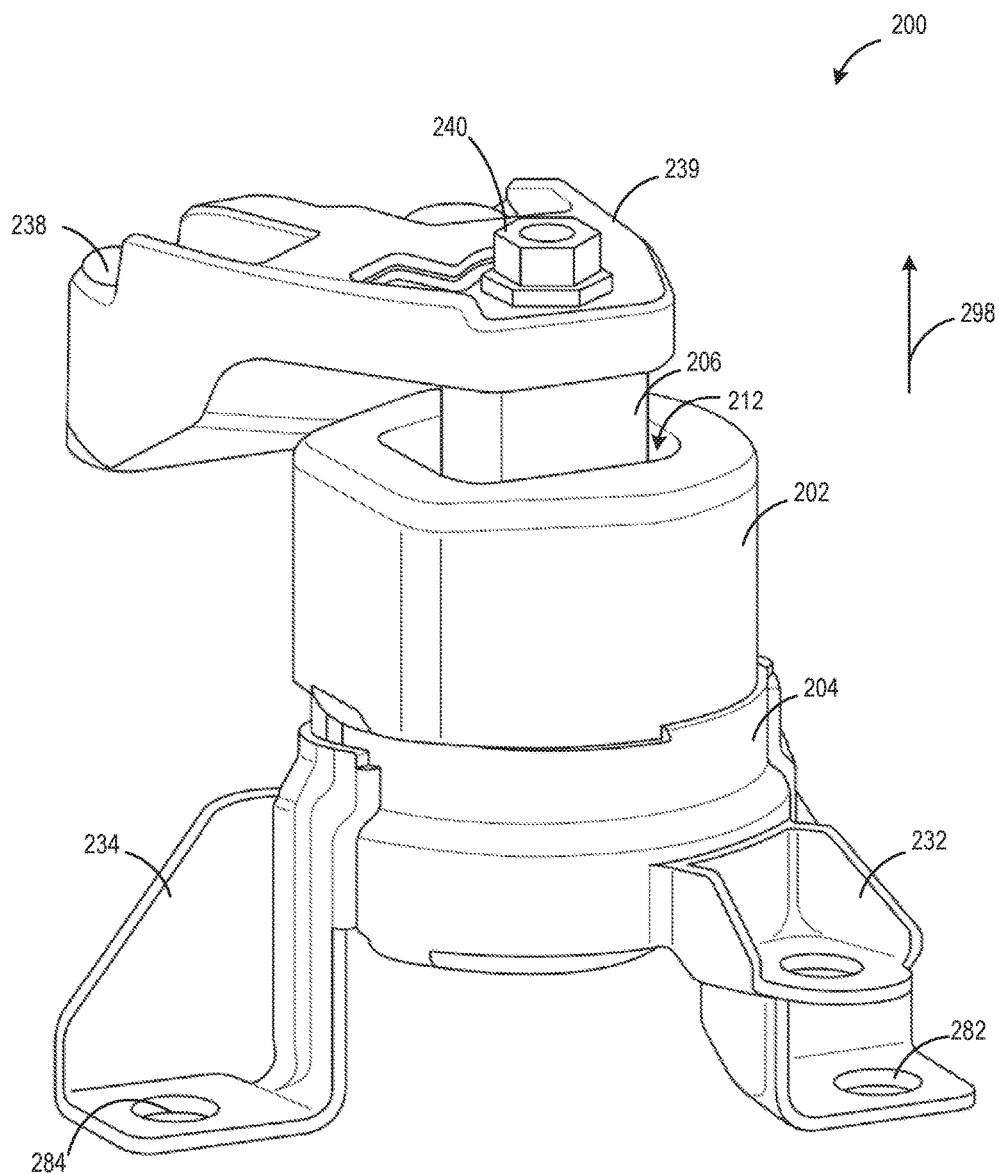
FIG. 2 shows an external view of an active engine mount that may be included within the vehicle of FIG. 1.
Figure 3:
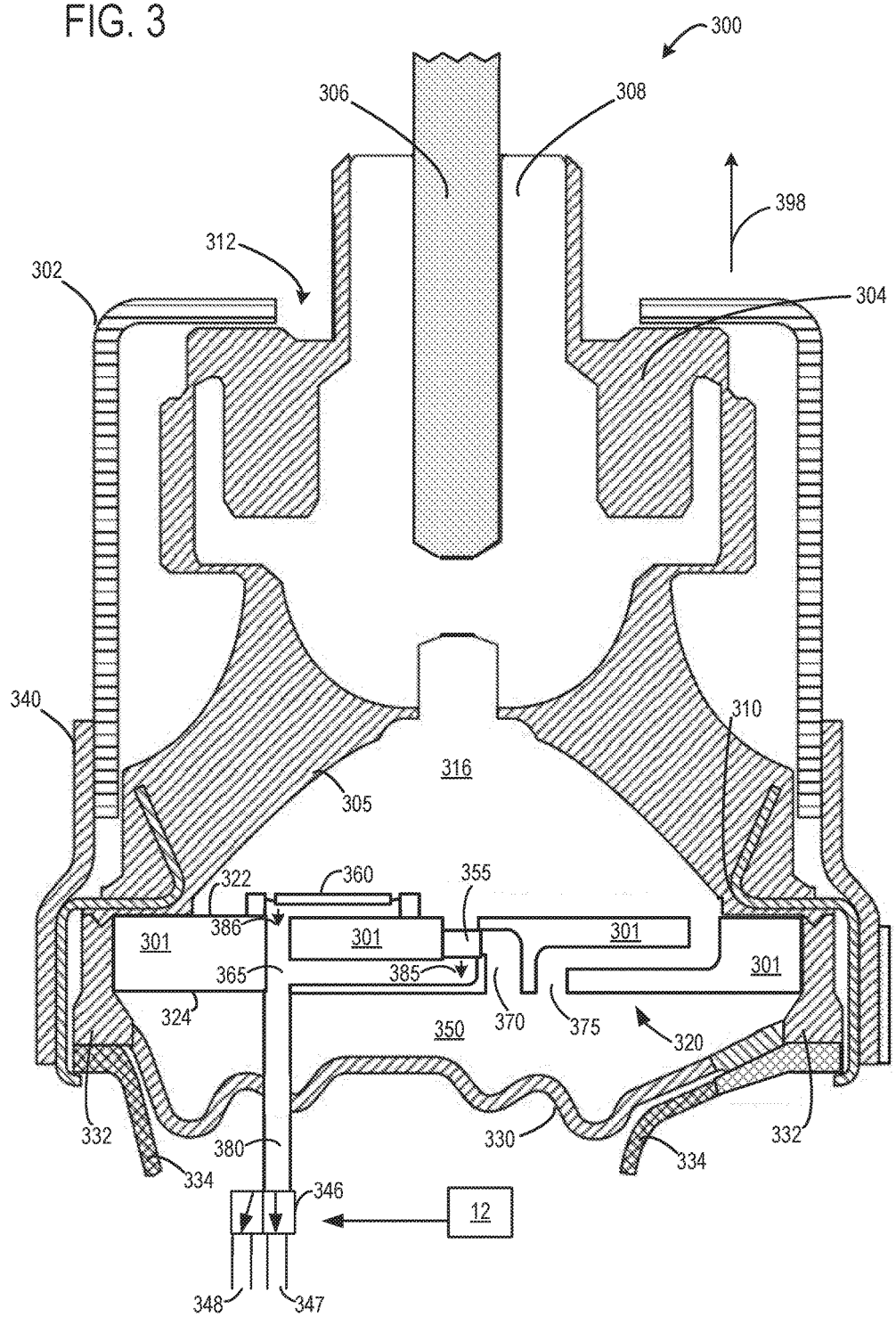
FIG. 3 shows a cross-sectional view of an example active engine mount, including a partitioning structure and decoupler element.
Figure 4:
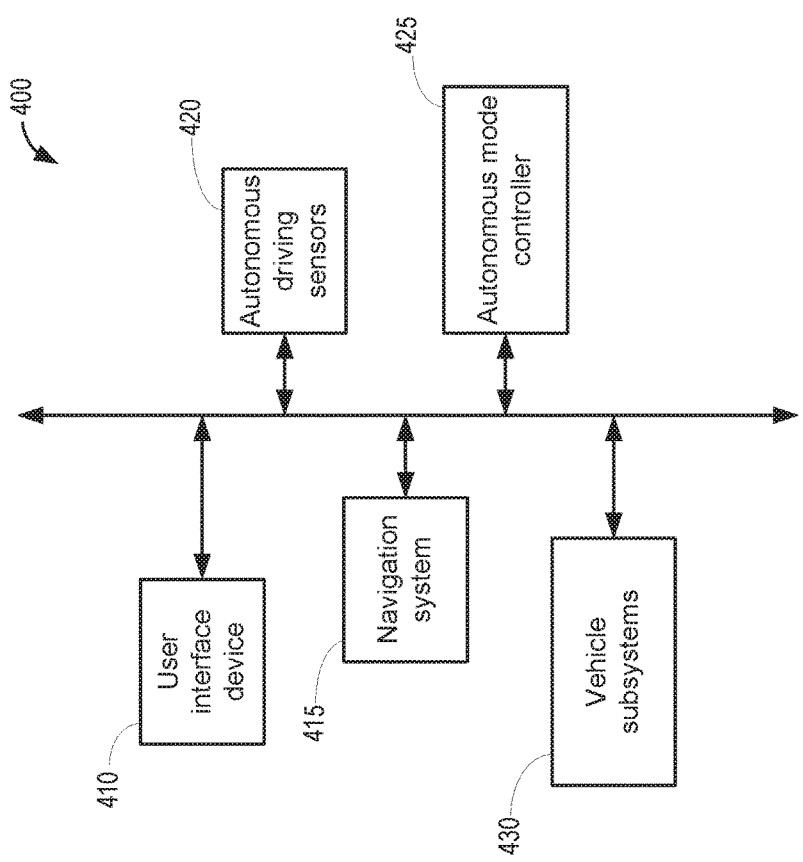
FIG. 4 schematically illustrates a block diagram of an example: autonomous driving system.
Figure 5:
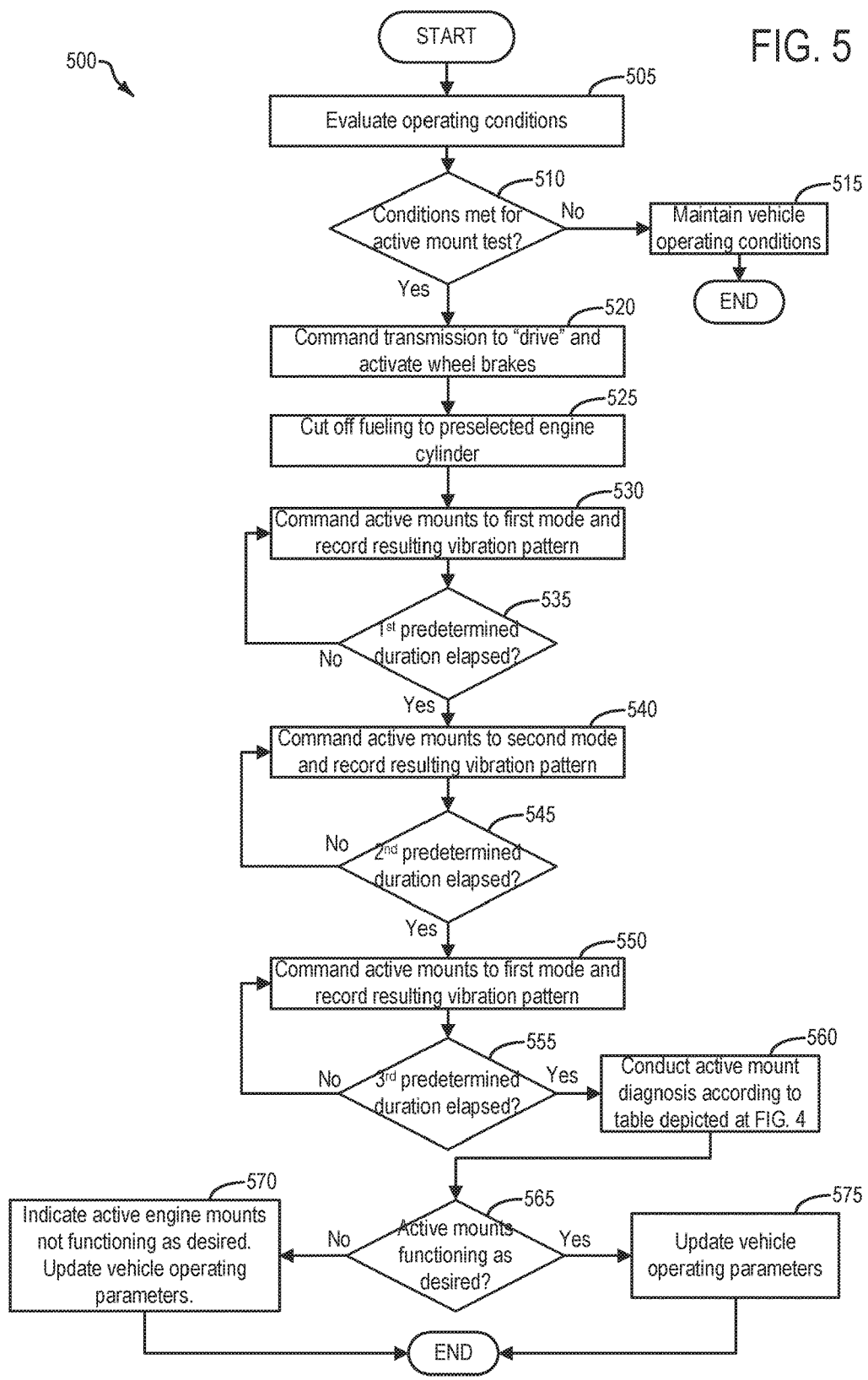
FIG. 5 shows a high-level flowchart for an example method for conducting an active engine mount test diagnostic procedure.

The following description relates to systems and methods for diagnosing whether active engine mounts in a vehicle are functioning as desired. For example, active engine mounts may be configured to isolate undesired noise, vibration, and harshness (NVH) from a vehicle chassis and cabin, as illustrated in the vehicle system depicted in FIG. 1. An example of an external view of an active engine mount, is depicted in FIG. 2. In some examples, an active engine mount may be controllable to at least two states, such as a first, dampening mode (e.g. idle mode), and a second, stiffening mode (e.g. ride mode). Accordingly, an example active engine mount controllable to a first, dampening mode, and a second, stiffening mode, is illustrated in FIG. 3. The vehicle system may in some examples comprise a vehicle propelled solely by an engine that combusts fuel (e.g. gasoline, diesel, or other fuel blend). However, in some examples, the vehicle system may comprise a hybrid vehicle, for example a hybrid electric vehicle (HEV), or a plug in hybrid electric vehicle (PHEV). In still other examples, the vehicle system may comprise an autonomously driven vehicle (AV). Accordingly, FIG. 4 depicts an AV system that may be incorporated into the vehicle system of FIG. 1, to provide opportunities for autonomously driven modes of vehicle operation. The active engine mounts may periodically be diagnosed as to whether the active engine mounts are functioning as desired, according to the method depicted at FIG. 5. Conducting the active engine mount test diagnostic may in some examples include determining whether the active engine mounts are functioning as desired, whether the one or more active engine mounts are stuck in the dampening mode, or whether the one or more engine mounts are stuck in the stiffening mode. Thus, in some examples, a lookup table, as indicated at FIG. 4, may be utilized to diagnose the active engine mounts. A timeline for conducting an active engine mount test diagnostic procedure, according to the method of FIG. 5, is depicted at FIG. 7.

Figure 1:
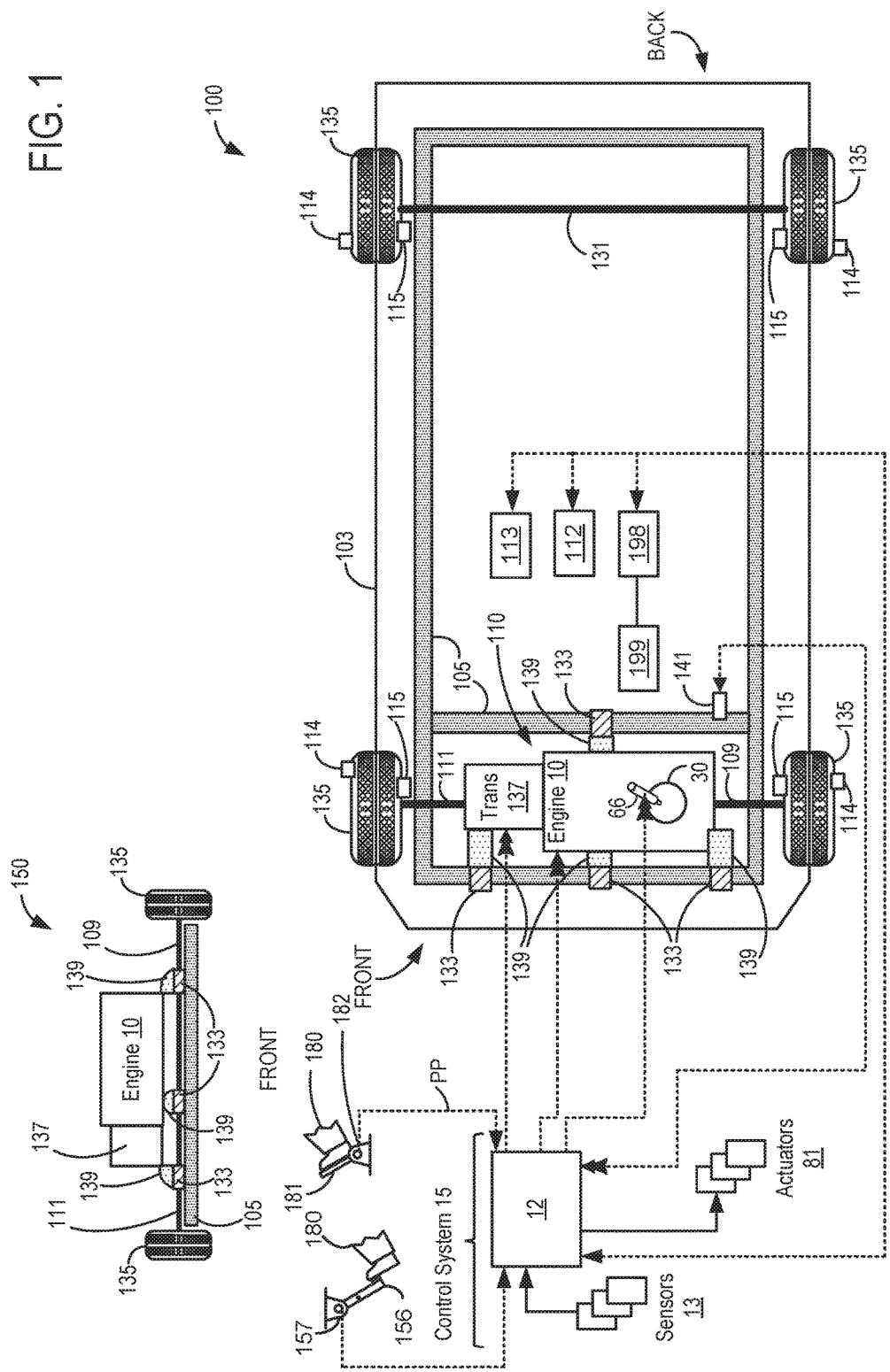
FIG. 1 schematically depicts an embodiment of a vehicle including a vehicle powertrain attached to a vehicle frame via one or more active engine mounts.

Turning now to FIG. 1, it schematically depicts an example vehicle system 100 as shown from a top view. Vehicle system 100 comprises a vehicle body 103 with a front end, labeled "FRONT", and a back end labeled "BACK." Vehicle system 100 may include a plurality of wheels 135. For example, as shown in FIG. 1, vehicle system 100 may include a first pair of wheels adjacent to the front end of the vehicle and a second pair of wheels adjacent the back end of the vehicle.

Vehicle system 100 may include an internal combustion engine, such as example engine 10, coupled to transmission 137. Engine 10 and transmission 137 may herein be referred to in combination as a vehicle powertrain 110 or a powertrain 110. It will be appreciated that other vehicle components coupled to one or more of engine and/or transmission 137 may also be included in the vehicle powertrain 110 without departing from the scope of the present invention. Vehicle system 100 is depicted as having a front wheel drive (FWD) transmission where engine 10 drives the front wheels via half shafts 109 and 111. In another embodiment, vehicle system 100 may have a rear wheel drive (RWD) transmission which drives the rear wheels via a driveshaft (not shown) and a differential (not shown) located on rear axle 131. In still other examples, vehicle system 100 may include a four wheel drive transmission.

Engine 10 and transmission 137 may be supported at least partially by frame, or chassis, 105, which in turn may be supported by plurality of wheels 135. As such, vibrations and movements from engine 10 and transmission 137 may be transmitted to frame 105. Frame 105 may also provide support to a body of vehicle system 100 and other internal components such that vibrations from engine operation may be transferred to an interior, or cabin, of vehicle system 100. In order to reduce transmission of vibrations to the interior, or cabin, of vehicle system 100, engine 10 and transmission 137 may be mechanically coupled via a plurality of members 139 to respective active engine mounts 133. Discussed herein, active engine mounts may refer to any type of active engine mount that may change its dampening characteristics. For example, such an active mount may be controlled to be relatively soft at engine idle to absorb undesired vibration, but may be controlled to stiffen at higher engine speeds and loads to limit undesired engine motion. As one example, engine manifold vacuum may be selectively applied to an active engine mount in order to change the characteristics of the active engine mount. Such an example will be discussed in greater detail with regard to FIG. 3. However, it may be understood that such an example is meant to be illustrative, and is not meant to be limiting. Thus, active engine mounts as discussed herein may refer to vacuum-regulated engine mounts, active motor mounts that counter engine vibration by commanding a counter shake to reduce intensity of engine vibration, magneto rheological mounts which may contain small particles of iron suspended in liquid such that when an electric current or magnetic field is applied to the fluid, the iron particles line up and effectively increase viscosity of the fluid, etc.

As depicted, engine 10 and transmission 137 are mechanically coupled at four locations to members 139 and via members 139 to four active engine mounts 133. In other alternate embodiments, a different number of members and active engine mounts may be used, without departing from the scope of the present disclosure.

View 150 depicts a view of vehicle system 100 as observed from the front end of vehicle system 100. Control system 15 including controller 12 may at least partially control engine 10 as well as vehicle system 100. The controller 12 receives signals from the various sensors 13 of FIG. 1 and employs the various actuators 81 of FIG. 1 to adjust engine operation based on the received signals and instructions stored on a memory of the controller. In the depicted example, controller 12 may receive input data from vibration sensor 141. Vibration sensor 141, in one example, may be an accelerometer. It will be appreciated that vehicle 100 may include a number of additional vibrational sensors affixed to vehicle frame 105, engine 10, transmission 137, hydraulic mounts 133, etc. without departing from the scope of the present invention.

For example, vehicle system 100 may also include inertial sensors 199. Inertial sensors 199 may comprise one or more of the following: longitudinal, latitudinal, vertical, yaw, roll, and pitch sensors. As one example, inertial sensors 199 may couple to the vehicle's restraint control module (RCM) 198, the RCM comprising a subsystem of control system 15. In some examples, the control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle.

Further, control system 15 and controller 12 may send control signals to actuators 81 which may include fuel injector 66 coupled to cylinder 30 in addition to other actuators of engine 10 and transmission 137 not depicted at FIG. 1. For illustrative purposes, only one cylinder 30 and one fuel injector 66 are shown. However, it may be understood that engine 10 may including a plurality of cylinders, and a plurality of fuel injectors. Controller 12 may receive input data from the various sensors, process the input data, and trigger the actuators in response to the processed input data based on instruction or code programmed therein corresponding to one or more routines. In one example, engine 10 may be controlled at least partially by control system including controller 12 and by input from a vehicle operator 180, or an autonomous controller (discussed in further detail below), via an input device 181. In one example, input device 181 includes an accelerator pedal and a pedal position sensor 182 for generating a proportional pedal position signal PP. Similarly, control system 15 may receive an indication of an operator requested vehicle braking via a human operator 180, or an autonomous controller. For example, control system 15 may receive sensory feedback from pedal position sensor 157 which communicates with brake pedal 156. In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 12 may monitor rotational speed of each wheel, and responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in detail below, ABS 113 may command an increased brake pressure at one or more wheels in order to conduct an active engine mount test diagnostic procedure. Herein, increasing brake pressure at one or more wheels via ABS 113 may be referred to as activating one or more wheel brakes. For example, ABS 113 may activate one or more wheel brakes in order to stiffen the vehicle frame and couple it mechanically to the engine, to conduct an active engine mount test diagnostic, as will be discussed in further detail below.

With regard to vehicle system 100, noise, vibration, and harshness (NVH) may arise during engine operation, transmission operation, during transitions in engine operating modes, etc. Additionally, NVH may arise as a result of driving over rough (e.g., uneven) surfaces. Active engine mounts 133 may be designed to dampen vehicle noise and vibrations across a broad range of frequencies, or alternatively may be designed to dampen specific ranges of vibrational frequencies. In this way, NVH arising from a number of different sources may each be dampened by a common active engine mount 133.

For example, as described above and which will be further elaborated below, active engine mounts 133 may be controlled via controller 12, to a first configuration, or first mode, for idle operation, and to a second configuration, or mode, for operating at higher engine speeds and loads. As will be discussed in further detail below with regard to the method depicted at FIG. 5, an active engine mount test diagnostic procedure may be periodically conducted in order to ascertain whether the active engine mounts are functioning as desired.

Turning now to FIG. 2, an external view of an example active engine mount 200 is shown. It may be understood that such an example is meant to be illustrative, and is not meant to be limiting. Active engine mount 200 may be an example of active engine mount 133 shown within vehicle system 100 at FIG. 1. When configured in a vehicle system that is on flat ground (e.g., vehicle system 100 at FIG. 1), active engine mount 200 may be oriented in a substantially vertical direction. However, in other configurations, active engine mount 200 may be oriented at an oblique angle relative to vertical. As used herein, however, the terms "upper" and "lower" may refer to respective ends of arrow 298, which indicates a directional axis specific to the active engine mount. That is to say, arrow 298 provides reference for a relative positioning of components constituting active engine mount 200, and not a reference for the orientation of active engine mount 200 within a vehicle system. Additionally, an upper end of the active engine mount may refer to the end closer toward the head of arrow 298 and a lower end of the active engine mount may refer the end closer toward the tail of arrow 298.

Active engine mount 200 includes an upper external housing 202 with a central opening 212 formed within a top surface thereof. Upper external housing 202 may be formed from a rigid material, such as a metal or hard plastic. Central opening 212 is configured to receive a fastener or bolt 206, which extends outwardly from a first elastomeric member or main rubber element (not shown, but see FIG. 3) for fastening to a component of the vehicle powertrain (e.g., one of engine 10 at FIG. 1). Bolt 206 may be formed from a rigid material such as steel or aluminum.

An upper end of bolt 206 may be configured to rotate about the clearance of central opening 212, while the lower end (not shown) may be lodged in a first elastomeric member of the active engine mount, and as such the lower end of the bolt may remain relatively stationary compared to the upper end of the bolt. In another example, bolt 206 may extend outwardly from a bearing member (not shown) that is partially encapsulated within the first elastomeric member of the housing, and may be configured to transfer vibrations to the first elastomeric member via the bearing member.

Bolt 206 may be coupled to a rigid upper bracket 239 via a fastener 240. It will be appreciated that upper bracket 239 may be similar to a member 139 described above with regard to FIG. 1. Upper bracket 239 may be formed from one of a metal or a hard plastic. A distal portion 238 of the upper bracket 239 may be coupled to a vehicle powertrain component (e.g., coupled to the powertrain component at a flange affixed thereto) via a fastener, in a manner generally known in the art.

Lower external housing 204 may be fastened (e.g., mechanically coupled) to upper housing 202. Lower housing 204 may be formed from a rigid material such as one of a metal or hard plastic. A coupling of the lower housing to a vehicle frame (e.g., 105 at FIG. 1) may be achieved via a plurality of lower brackets. In this way, the external housing may remain structurally rigid (e.g., substantially non-compressible), and any vibrations absorbed from the vehicle powertrain or vehicle frame may be transferred to the first elastomeric member within the external housing, said first elastomeric member configured to dampen the vibrations.

Shown in FIG. 2 are first lower bracket 232 and second lower bracket 234. It will be appreciated that still further brackets may be affixed to lower housing 204 in a similar manner to brackets 232 and 234 without departing from the scope of the invention. The lower brackets may be formed from metal, such as steel. However, other materials may be used to form the lower brackets without departing from the scope of the present invention. First lower bracket 232 is shown integrally formed with lower housing 204. A bolt (not shown) may couple (e.g., mechanically) lower bracket 232 to a vehicle frame via hole 282. Second lower bracket 234 is shown affixed to, but not integrally formed with, lower housing 204, and may similarly be coupled to the vehicle frame via hole 284.

FIG. 3 shows a cross-sectional view 300 of an active engine mount (e.g., active engine mount 133 at FIG. 1 or active engine mount 200 at FIG. 2). It may be understood that the active engine mount depicted at FIG. 3 is meant to be illustrative, and is not meant to be limiting. As used herein, the terms "upper" and "lower" may refer to respective ends of arrow 398, as described above with reference to arrow 298 in FIG. 2. It will be appreciated that arrow 398 may provide a reference for the relative positioning of components within the active engine mount, as described above with reference to arrow 298.

The active engine mount assembly may include an external housing 302 (e.g., similar to 202 at FIG. 2) dimensioned to receive a first elastomeric member or main rubber element 304 that is generally shaped as a truncated cone, and primarily made of an elastomeric material, such as an elastic rubber as is conventional in the art. A bolt 306 (e.g., similar to 206 at FIG. 2) extends outwardly from the first elastomeric member for fastening to the powertrain or engine (not shown, but see FIG. 2) in a manner generally known in the art. In the depicted example, bolt 306 with a metal bearing member 308 of which at least a lower portion encapsulated within the first elastomeric member 304. In addition, a lower peripheral portion of the first elastomeric member may include a stiffener, such as metallic stiffener 310, molded within the first elastomeric member to add rigidity and support. In this way, vibrations and/or displacements from the powertrain may be transferred to the first elastomeric member 304 of the active engine mount.

As discussed above with regard to FIG. 2, the first elastomeric member is received within the upper external housing 302 so that the bolt 306 extends through a central opening 312 in the restrictor. The lower surface 305 of the first elastomeric member 304 forms a portion of a first or upper fluid chamber 316, namely a high pressure side, of the engine mount. First fluid chamber 316 may be filled with a hydraulic fluid (e.g., glycol). The remainder of the first fluid chamber 316 is defined by the inertia track assembly 320. It may be understood that inertia track assembly 320 may herein also be referred to as a partitioning structure. An outer portion of an upper surface of the partitioning structure (denoted by reference numeral 322) abuttingly and sealingly engages the first elastomeric member 304 in order to seal the first fluid chamber 316. A second outer portion of the partitioning structure along the lower surface denoted by reference numeral 324 is sealingly engaged by a second elastomeric member 330 (a rubber boot or diaphragm) and particularly an upper peripheral portion 332 thereof. Lower surface 324 of the partitioning structure 320, in combination with second elastomeric member 330, form a second or lower fluid chamber 350. Second fluid chamber may too be filled with a hydraulic fluid (e.g., glycol). The second elastomeric member 330 is protected by a diaphragm cover 334, preferably formed of a more rigid material than the elastomeric diaphragm, and that matingly engages (e.g., mechanically couples to) the lower external housing 340. When the lower housing 340 is fastened to the upper housing, the lower peripheral edge of the first elastomeric member 304 and the peripheral portion 332 of the second elastomeric member sealingly engage opposite sides or faces 322, 324, respectively, of the partitioning structure 320.

The partitioning structure and operation of a typical engine mount 300 will be briefly described. As indicated, the first fluid chamber 316 and the second fluid chamber 350 are fluidly coupled together by partitioning structure 320. Partitioning structure 320 comprises a channel plate 301, a decoupler 360 (e.g., compliant membrane), a first fluid track 370 (e.g., idle track), a second fluid track 440 (e.g. ride track), and a vacuum chamber 365. Vacuum chamber 365 may be coupled to the partitioning structure such that the vacuum chamber may defined by passageways in the channel plate 301, and wherein a segment of the vacuum chamber is defined by decoupler 360. Vacuum chamber 365 may be fluidly connected to a source of either vacuum, or atmospheric pressure, via conduit 380. Vacuum may be provided by any available source of vehicle vacuum, for example intake manifold vacuum. In one example, a first pressure 347 (e.g. atmospheric pressure), or a second pressure 348 (e.g. vacuum) may be applied to vacuum chamber 365, via controlling two way valve 446. For example, controller 12, may command two way valve 446 to enable the first pressure, or the second pressure, to be communicated to vacuum chamber 365, depending on vehicle operating conditions, as will be discussed in further detail below. More specifically, controller 12 may send a signal to two-way valve 346 to actuate the valve to either couple first pressure 347 to vacuum chamber 365, or to couple second pressure 348 to vacuum chamber 365.

When vacuum chamber 365 is at atmospheric pressure (e.g., a first pressure), decoupler 360 may be free to move. Furthermore, when vacuum chamber 365 is at atmospheric pressure, a first vacuum actuated valve 355 is seated in an upper position within channel plate 301 such that the first fluid track 370 is closed. When in such a configuration, the decoupler 360 may breathe in response to vibrations or displacements, and fluid flow between first fluid chamber 316 and second fluid chamber 350 may only be allowed via the second fluid track 375. As such, engine mount 300 typifies decoupled engine mount function when vacuum chamber 365 is at atmospheric pressure. Such a configuration of active engine mount 300 may be termed a second, or stiffening mode of active engine mount operation.

Alternatively, application of vacuum to vacuum chamber 365 may serve to seat decoupler 360 against channel plate 301, indicated by arrow 386, and furthermore may position first vacuum actuated valve in a lower position, indicated by arrow 385. As such, first fluid track 370 is opened, and decoupler 360 is not permitted to move, or breathe. Accordingly, fluid flow between first fluid chamber 316 and second fluid chamber 350 occurs via the first fluid track 370, as first fluid track 370 represents the path of least resistance through the inertia track assembly 320, thus providing a soft engine mount for idle mode operation. In other words, with vacuum chamber 365 coupled to second pressure 348 (e.g. vacuum), active engine mount 300 may be understood to be operating in a first, or dampening mode of active engine mount operation.

As discussed above, in some examples vehicle system 100 may be controlled autonomously, such that vehicle system 100 may be autonomously driven. In such an example, a vehicle operator and passengers may or may not be present in the vehicle during operation. In circumstances where a vehicle operator or passengers are not present, it may be challenging to diagnose whether undesired engine vibration is being transmitted to the vehicle frame and cabin. In such an example, the inventors herein find it desirable to periodically diagnose whether the active engine mounts are functioning as desired. However, it may be understood that such a diagnostic method, discussed in detail below with regard to FIG. 5, is not limited to use in vehicle that may be driven autonomously.

FIG. 4 is a block diagram of an example autonomous driving system 400 that may operate the vehicle system 100, described above at FIG. 1. Herein, the vehicle system 100 will be referred to simply as a "vehicle". The autonomous driving system 400, as shown, includes a user interface device 410, a navigation system 415, at least one autonomous driving sensor 420, and an autonomous mode controller 425.

The user interface device 410 may be configured to present information to vehicle occupants, under conditions wherein a vehicle occupant may be present. However, it may be understood that the vehicle may be operated autonomously in the absence of vehicle occupants, under certain conditions. The presented information may include audible information or visual information. Moreover, the user interface device 410 may be configured to receive user inputs. Thus, the user interface device 410 may be located in the passenger compartment (not shown) of the vehicle. In some possible approaches, the user interface device 410 may include a touch-sensitive display screen.

The navigation system 415 may be configured to determine a current location of the vehicle using, for example, a Global Positioning System (GPS) receiver configured to triangulate the position of the vehicle relative to satellites or terrestrial based transmitter towers. The navigation system 415 may be further configured to develop routes from the current location to a selected destination, as well as display a map and present driving directions to the selected destination via, for example, the user interface device 410.

The autonomous driving sensors 420 may include any number of devices configured to generate signals that help navigate the vehicle. Examples of autonomous driving sensors 420 may include a radar sensor, a lidar sensor, a vision sensor (e.g. a camera), vehicle to vehicle infrastructure networks, or the like. The autonomous driving sensors 420 may enable the vehicle to "see" the roadway and vehicle surroundings, and/or negotiate various obstacles while the vehicle 100 is operating in autonomous mode. The autonomous driving sensors 420 may be configured to output sensor signals to, for example, the autonomous mode controller 425.

The autonomous mode controller 425 may be configured to control one or more subsystems 430 while the vehicle is operating in the autonomous mode. Examples of subsystems 430 that may be controlled by the autonomous mode controller 425 may include a brake subsystem, a suspension subsystem, a steering subsystem, and a powertrain subsystem. The autonomous mode controller 425 may control any one or more of these subsystems 430 by outputting signals to control units associated with subsystems 430. In one example, the brake subsystem may comprise an anti-lock braking subsystem, configured to apply a braking force to one or more of wheels (e.g. 135). Discussed herein, applying the braking force to one or more of the vehicle wheels may be referred to as activating the brakes. To autonomously control the vehicle, the autonomous mode controller 425 may output appropriate commands to the subsystems 430. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Thus, the above systems may enable a system for a vehicle, comprising an engine with one or more engine cylinders, and one or more active engine mounts configured to isolate engine vibrations from a vehicle chassis and a vehicle cabin, and controllable to a first, dampening mode, and a second, stiffening mode. The system may further comprise one or more vibrational sensors configured to monitor vehicle chassis and cabin vibration, and a controller storing instructions in non-transitory memory. Responsive to an indication that preconditions for an active engine mount test diagnostic are met, the controller may execute the instructions to actively induce degraded combustion events in a preselected engine cylinder. The controller may further command the one or more active engine mounts to the dampening mode for a first predetermined time duration, command the one or more active engine mounts to the stiffening mode for a second predetermined time duration, and command the one or more active engine mounts to the dampening mode for a third predetermined time duration while degraded combustion events are occurring in the preselected engine cylinder.

In such a system, the controller may further monitor vibrations via the one or more vibrational sensors during the first predetermined time period, during the second predetermined time period, and the third predetermined time period. The controller may indicate that the active engine mounts are functioning as desired responsive to vibrations as monitored via the one or more vibrational sensors being dampened below a vibration threshold during the first predetermined time period and the third predetermined time period, but not during the second predetermined time period.

In some examples, the controller may further store instructions in non-transitory memory, that when executed, cause the controller to indicate that the active engine mounts are stuck in the first, dampening mode, responsive to vibrations as monitored via the one or more vibrational sensors being dampened below the vibration threshold during each of the first, second, and third predetermined time periods. In another example, the controller may indicate that the active engine mounts are stuck in the second, stiffening mode, responsive to vibrations as monitored via the one or more vibrational sensors being above the vibration threshold during each of the first, second, and third predetermined time periods.

In some examples, such a system may further comprise one or more fuel injectors configured to deliver fuel to the one or more engine cylinders. In such an example, the controller may further store instructions in non-transitory memory, that when executed, cause the controller to command a fuel injector configured to deliver fuel to the preselected cylinder to stop injection of fuel to actively induce degraded combustion events in the preselected engine cylinder.

In some examples, preconditions for the active engine mounts test diagnostic procedure being met may include one or more of an engine idle condition, and a duration of time elapsing since a prior active engine mount diagnostic.

In some examples, the system may further comprise an antilock brake system for increasing or decreasing hydraulic pressure to one or more vehicle wheel brakes, and a transmission. In such an example, responsive to an indication that preconditions for an active engine mount test diagnostic procedure are met, the controller may command or maintain application of the wheel brakes, and command the transmission to a drive mode of operation.

Turning to FIG. 5, a high-level example method 500 for conducting an engine mount diagnostic, is shown. Method 500 will be described with reference to the systems described herein and shown in FIGS. 1-4, though it should be understood that similar methods may be applied to other systems without departing from the scope of this disclosure. Method 500 may be carried out by a controller, such as controller 12 in FIG. 1, and may be stored at the controller as executable instructions in non-transitory memory. Instructions for carrying out method 500 may be executed by the controller based on instructions stored on a memory of the controller and in conjunction with signals received from sensors of the engine system, such as the sensors described above with reference to FIG. 1 and FIG. 4. The controller may employ vehicle system actuators, such as fuel injectors (e.g. 66), two way valve (e.g. 346), transmission (e.g. 137), brake pedal (e.g. 156), etc., according to the method depicted below.

Method 500 begins at 505, and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 510, method 500 may include indicating whether conditions are met for conducting an active engine mount diagnostic procedure. For example, conditions being met may include an engine on condition. Conditions being met for the active engine mount diagnostic may further include an indication that the vehicle is in an idle mode, where the engine is running, but where the vehicle is not in motion. In other words, conditions being met for the active engine mount diagnostic may include static vehicle conditions. Still further, conditions being met for the active engine mount diagnostic may include a predetermined period of time elapsing since a prior active engine mount diagnostic procedure was conducted. In some examples, the predetermined period of time may include 30 days, or less than 30 days. In other examples, the predetermined period of time may include greater than 30 days, but less than 60 days. In further examples the predetermined period of time may include greater than 60 days. Such examples are meant to be illustrative, and are not meant to be limiting. For example, vibration sensors (e.g. 141) or inertial sensors (e.g. 199) may be utilized to indicate undesired or excessive vibration, where undesired or excessive vibration may be utilized as an entry condition to conduct the active engine mount diagnostic procedure.

If, at 510, conditions are not indicated to be met for the active engine mount diagnostic procedure, method 500 may proceed to 515, and may include maintaining current vehicle operating conditions without conducting the active engine mount diagnostic procedure. Method 500 may then end.

Returning to 510, if conditions are indicated to be met for conducting the active engine mount diagnostic procedure, method 500 may proceed to 520. At 520, method 500 may include commanding the transmission (e.g. 137) to "drive". More specifically, vehicle transmission may be configured in one of park, reverse, neutral, drive, or low, for example. Thus, at 520, method 500 may include commanding the transmission to the drive mode of operation, or if already in drive mode, maintaining the transmission in drive mode. Furthermore, at step 520, method 500 may include activating wheel brakes via, for example, antilock braking system (e.g. 113) configured to increase hydraulic pressure to one or more vehicle wheels to increase braking force on the one or more wheels. In one example, where the brake pedal is already depressed via a vehicle operator, the brake pedal may be maintained depressed. With the vehicle transmission configured in drive mode, and with the brake pedal depressed, or with brakes activated, the vehicle frame (e.g. 105) may be stiffened, and mechanically coupled to the engine (e.g. 10).

Proceeding to 530, method 500 may include cutting off fueling to a preselected engine cylinder (e.g. 30). For example, the vehicle controller may send a command to a fuel injector (e.g. 66), actuating the fuel injector to stop injection of fuel to the preselected engine cylinder. In one example, the preselected engine cylinder may include a cylinder that, when fuel injection is terminated to that cylinder, results in the greatest amount of vibration being transmitted to the vehicle frame. In other words, degraded combustion may be induced in the preselected cylinder such that engine mechanical vibration, the result of degraded combustion while fuel injection to the preselected cylinder is stopped, is transmitted to the vehicle frame in a predictable fashion. More specifically, vibrations from the engine and transferred to the vehicle frame may correspond to the degraded combustion events, such that degraded combustion events may be correlated with increased vibration, as will be elaborated upon in more detail below.

Proceeding to 530, method 300 may include commanding active engine mounts to a first mode (e.g. dampening mode) of operation, and may further include recording the resulting pattern of vehicle frame vibration. In one example, referring to the example active engine mount (e.g. 300) depicted at FIG. 3, commanding the active engine mounts to the first, dampening mode of operation may include commanding a two-way valve (e.g. 346) to couple vacuum (e.g. 348) to a vacuum chamber (e.g. 365) of the active engine mount (e.g. 300). In one example, vibration may be monitored via vibrational sensors (e.g. 141), or inertial sensors (e.g. 199). Herein, the first mode of active engine mount operation may be understood to include a damping mode of operation. In the damping mode, vehicle vibrations due to the degraded combustion events may be expected to be dampened via the active engine mounts, such that little to no vibrations may be indicated responsive to the degraded combustion events. In other words, in the damping, or first mode, vehicle vibrations may not be expected to correlate with the degraded combustion events. Instead, the mechanical vibrations induced by the degraded combustion events may be effectively damped via the active engine mounts, such that little to no vibration is indicated as monitored via the vibrational, or inertial, sensors. Vibrations that are effectively dampened may herein refer to vibrations that are below a vibration threshold, for example.

Commanding the active engine mounts to the first mode at 530 may include commanding the active engine mounts to the first mode for a first predetermined time duration. Accordingly, proceeding to 535, method 500 may include indicating whether the first predetermined time duration has elapsed. If the first predetermined time duration is not yet indicated to have elapsed, method 500 may return to 530, and may include continuing to maintain the active engine mounts in the first mode, and may further include continuing to record the resulting pattern of vehicle frame vibration.

Alternatively, responsive to the first predetermined time duration elapsing at 535, method 500 may proceed to 540. At 540, method 500 may include commanding the active engine mounts to a second mode of operation, and may further include recording the resulting pattern of vehicle frame vibration. Referring to the example active engine mount (e.g. 300) depicted at FIG. 3, commanding the active engine mount to the second mode of operation may include commanding a two-way valve (e.g. 346) to couple atmospheric pressure (e.g. 347) to a vacuum chamber (e.g. 365) of the active engine mount. Similar to that discussed above, vibration may be monitored via vibrational sensors (e.g. 141), or inertial sensors (e.g. 199). Herein, the second mode of active engine mount operation may be understood to include a stiffening mode of operation. In the stiffening mode, vehicle vibrations due to the degraded combustion events may be expected to be significant, or not substantially dampened, such that vehicle vibrations as recorded via the vibrational sensors or inertial sensors, may be correlated with the degraded combustion events. As discussed, the resulting pattern of vehicle vibration while the predetermined cylinder is cut off from fuel injection, and while the active engine mounts are configured in the second mode (e.g. stiffening mode), may be stored at the controller. Herein, vehicle vibrations not effectively dampened may refer to vehicle vibrations that are above the vibration threshold, for example, as compared to vehicle vibrations that are effectively dampened, which may be below the vibration threshold.

Commanding the active engine mounts to the second mode at 540 may include commanding the active engine mounts to the second mode for a second predetermined time duration. In some examples, the second predetermined time duration may be different than that of the first predetermined time duration. However, in other examples, the second predetermined duration may comprise the same, or substantially the same, time duration as the first predetermined time duration. Accordingly, proceeding to 545, method 500 may include indicating whether the second predetermined time duration has elapsed. If, at 545, the second predetermined time duration is not yet indicated to have elapsed, method 500 may return to 540, and may include continuing to maintain the active engine mounts in the second mode, and may further include continuing to record the resulting pattern of vehicle frame vibration.

Alternatively, responsive to the second predetermined time duration elapsing at 545, method 500 may proceed to 550. At 550, method 500 may include commanding the active engine mounts to the first mode of operation again. As discussed above, the first mode of operation may include a mode of operation wherein the active engine mounts are configured in a damping mode of operation. Accordingly, the resulting pattern of vehicle frame vibration may again be recorded via the vehicle controller while the active engine mounts are configured in the first mode. The return to the first mode of operation may be carried out for a third predetermined time duration. In some examples, the third predetermined time duration may be the same, or substantially the same, as the first predetermined time duration and/or the second predetermined time duration. However, in other examples, the third predetermined time duration may not be the same time duration as that of the first predetermined time duration, or the second predetermined time duration.

Thus, proceeding to 555, method 500 may include indicating whether the third predetermined time duration has elapsed. If, at 555, the third predetermined time duration is not yet indicated to have elapsed, method 500 may return to 550, and may include continuing to maintain the active engine mounts in the first mode, and may further include continuing to record the resulting pattern of vehicle frame vibration.

Alternatively, responsive to the third predetermined time duration elapsing at 555, method 500 may proceed to 560. At 560, method 500 may include conducting an active engine mount diagnosis according to the table depicted at FIG. 6.

Turning now to FIG. 6, table 600 illustrates potential outcomes of the active engine mount test diagnostic procedure. In some examples, table 600 may comprise a lookup table, and may be stored at the vehicle controller, for example. The recorded pattern of vehicle vibration during the first predetermined time period where the active engine mounts are configured in the first mode, during the second predetermined time period where the active engine mounts are configured in the second mode, and during the third predetermined time period where the active engine mounts are configured in the first mode, may be compared to table 600 in order to diagnose the active engine mounts.

Three potential diagnoses are indicated, termed outcome A, outcome B, and outcome C. More specifically, it may be determined as to whether vehicle frame vibrations are correlated with degraded combustion events. In some examples, vehicle vibrations may be correlated with degraded combustion events responsive to indicated vehicle vibration(s) above a threshold vibration level (vibration threshold level), as discussed above, and may further comprise the vehicle vibration(s) within a threshold time of the degraded combustion event. For example, a magnitude of vehicle frame vibrations may be indicated via the vibrational sensors and/or via the inertial sensors, and the magnitude of the vibrations may be compared to the threshold vibration level. Furthermore, a timing sequence of degraded combustion events may be stored at the controller, and vehicle vibrations that are above the threshold vibration level, and which are within a threshold time of the degraded combustion event, may be indicated to be correlated with a particular degraded combustion event. Based on the mode of operation of the active engine mounts in the first predetermined time period 530, the second predetermined time period 540, and the third predetermined time period 550, and whether the vibrational pattern of the vehicle frame is correlated with degraded combustion events during the first, second, and third predetermined time period, a diagnosis may be determined as to whether the active engine mounts are functioning as desired (e.g. outcome A), whether active engine mounts are stuck in the first, damping mode (e.g. outcome B), or whether the active engine mounts are stuck in the second, stiffening mode (e.g. outcome C).

More specifically, it may be determined that the vehicle active engine mounts are functioning as desired (e.g. outcome A) responsive to the recorded vibrational pattern not correlating (No) with degraded combustion events in the first mode during the first predetermined time period, correlating (yes) with degraded combustion events in the second mode during the second predetermined time period, and not correlating (No) with degraded combustion events in the first mode during the third predetermined time period. As an example, during the first predetermined time period where the active engine mounts are configured in the first mode, degraded combustion events may be expected to be substantially dampened. Thus, the recorded pattern of vibration may not be expected to correlate with degraded combustion events. In other words, any vibrations induced by the degraded combustion events may be expected to be below the threshold vibration level. Alternatively, responsive to the active engine mounts being configured in the second position during the second predetermined time period, vibrations induced by the degraded combustion events may be expected to be above the threshold vibration level, thus the recorded vibrational pattern may be expected to correlate with the degraded combustion events during the second predetermined time period, where the active engine mounts are configured in the second position. Furthermore, during the third predetermined time period, where the active engine mounts may be returned to the first, dampening mode of operation, it may be again expected that the recorded pattern of vibration may not correlate with degraded combustion events.

Thus, if a recorded pattern of vehicle frame vibration does not correlate (No) with degraded combustion events in the first mode during the first predetermined time duration, correlates (Yes) with degraded combustion events in the second mode during the second predetermined time duration, and does not correlate (No) with degraded combustion events in the first mode during the third predetermined time duration, it may be indicated that the active engine mounts are functioning as desired.

In another example, it may be determined that the vehicle active engine mounts are stuck in the first, dampening mode (e.g. outcome B), responsive to the recorded vibrational pattern not correlating (No) with degraded combustion events in the first mode during the first predetermined time period, not correlating (No) with degraded combustion events in the second mode during the second predetermined time period, and not correlating (No) with degraded combustion events in the first mode during the third predetermined time period. As discussed above, during the first predetermined time period where the active engine mounts are configured in the first mode, degraded combustion events may be expected to be substantially dampened, which is observed in the during the first predetermined time period, as the vibrational pattern is not indicated to be correlated with degraded combustion events (No). Upon transition to the second mode of operation during the second predetermined time period, it may be expected that the recorded pattern of vibrations correlate with degraded combustion events. However, for outcome B, upon transition to the second mode of operation, the pattern of vehicle vibrations are not indicated to be correlated with degraded combustion events. Furthermore, during the third predetermined time period where the active engine mounts are configured again in the first mode, degraded combustion events may be expected to be substantially dampened. Thus, responsive to the recorded vibrational pattern not correlating with degraded combustion events during any of the first predetermined time duration where the active engine mounts are configured in the first mode, second predetermined time duration where the active engine mounts are configured in the second mode, and third predetermined time duration where the active engine mounts are configured in the first mode, it may be indicated that the active engine mounts may be stuck in the first, dampening mode of operation (e.g. outcome B).

In another example, it may be determined that the vehicle active engine mounts are stuck in the second, stiffening mode (e.g. outcome C), responsive to the recorded vibrational pattern correlating (Yes) with degraded combustion events in the first mode during the first predetermined time period, correlating (Yes) with degraded combustion events in the second mode during the second predetermined time period, and further correlating (Yes) with degraded combustion events in the first mode during the third predetermined time period. As discussed above, during the first predetermined time period where the active engine mounts are configured in the first mode, degraded combustion events may be expected to be substantially dampened, which may not be observed during the first predetermined time period for outcome C. In other words, while the vehicle frame vibrations are not expected to be correlated with the degraded combustion events during the first predetermined time period, instead, the vehicle frame vibrations are indicated to be correlated (Yes) with the degraded combustion events. Furthermore, upon transition to the second mode of operation during the second predetermined time period, it may be expected that the recorded pattern of vibrations correlate with degraded combustion events. For outcome C, the recorded pattern of vibrations is indicated to correlate (Yes) with degraded combustion events during the second predetermined time period where the active engine mounts are configured in the second mode. Still further, upon transition to the first mode of operation during the third predetermined time period, it may be expected that the recorded pattern of vibrations do not correlate with degraded combustion events. However, for outcome C, the recorded pattern of vibrations is indicated to correlate (Yes) with degraded combustion events during the third predetermined time period where the active engine mounts are configured in the first mode. Thus, responsive to the recorded vibrational pattern correlating (Yes) with degraded combustion events during each of the first predetermined time duration where the active engine mounts are configured in the first mode, the second predetermined time duration where the active engine mounts are configured in the second mode, and the third predetermined time duration where the active engine mounts are configured in the first mode, it may be indicated that the active engine mounts may be stuck in the second, stiffening mode of operation (e.g. outcome C).

Thus, returning to step 560 of method 500, the method may include diagnosing whether the active engine mounts are functioning as desired (e.g. outcome A), whether the active engine mounts are stuck in the first mode (e.g. outcome B), or whether the active engine mounts are stuck in the second mode (e.g. outcome C). As discussed, the pattern of vehicle frame vibration during the first, second, and third predetermined time durations may be determined, and it may be further indicated as to whether such patterns correlate with degraded combustion events during each of the first, second, and third predetermined time durations. By comparing the results of whether vehicle vibrations are correlated with degraded combustion events during the first predetermined time period where the active engine mounts are configured in the first mode, during the second predetermined time period where the active engine mounts are configured in the second mode, and during the third predetermined time period where the active engine mounts are configured in the first mode, table 600 may be used to diagnose functionality of the active engine mounts.

Accordingly, proceeding to 565, method 500 may include indicating whether the active engine mounts are functioning as desired, or whether the active engine mounts are stuck in either the first, dampening mode, or the second, stiffening mode. Responsive to an indication that the active engine mounts are functioning as desired, method 500 may proceed to 575, and may include updating vehicle operating parameters. Updating vehicle operating parameters at 575 may include storing the results of the test diagnostic at the controller. For example, it may be indicated that an active engine mount diagnostic was conducted, and that responsive to the active engine mount diagnostic being conducted, it was determined that the vehicle active engine mounts are functioning as desired. Method 500 may then end.

Alternatively, at 565, responsive to an indication that the active engine mounts are not functioning as desired, method 500 may proceed to 570. For example, at 570, method 500 may include indicating that either the active engine mounts are stuck in the first, dampening mode, or that the active engine mounts are stuck in the second, stiffening mode. Accordingly, at 570, method 500 may include updating vehicle operating parameters. For example, updating vehicle operating parameters at 570 may include storing the results of the test diagnostic at the controller. More specifically, it may be indicated that an active engine mount test diagnostic procedure was conducted, and that responsive to the active engine mount being conducted, the active engine mounts are indicated to be stuck in one of the first mode, or the second mode, depending on the outcome of the test diagnostic. Updating vehicle operating parameters at 570 may further include setting a flag at the controller, or setting a diagnostic trouble code (DTC). Still further, updating vehicle operating parameters at 570 may include illuminating a malfunction indicator light (MIL), alerting a vehicle operator (if present) of the need to service the vehicle. In some examples, updating vehicle operating parameters at 570 may include limiting a maximum engine speed responsive to an indication that the active engine mounts are stuck in the second, stiffening mode.

Turning now to FIG. 7, an example timeline 700 is shown, for conducting an active engine mount test diagnostic procedure, according to method 500 depicted herein, and with reference to FIG. 5, and as applied to the systems described herein and with reference to FIGS. 1-4. Timeline 700 includes plot 705, indicating whether a vehicle engine (e.g. 10) is in operation (yes), or not (no), over time. For example, an engine in operation may include the engine combusting air and fuel. Timeline 700 further includes plot 710, indicating vehicle speed, over time. The vehicle may be stopped, or may be traveling at various speeds (+) greater than when stopped. Timeline 700 further includes plot 715, indicating whether conditions are met for an engine mount test, over time. Conditions may be met (yes), or not (no). Timeline 700 further includes plot 720, indicating whether the active engine mounts are configured in a first, dampening mode, or a second, stiffening mode, over time. Timeline 700 further includes plot 725, indicating whether fueling to a preselected cylinder is maintained (on), or cut off (off), over time. Timeline 700 further includes plot 730, indicating whether degraded combustion events are indicated (yes), or not (no), over time. Timeline 700 further includes plot 735, indicating vibrations of the vehicle frame as recorded via vibration sensors (e.g. 141), and/or inertial sensors (e.g. 199), over time. Line 736 represents a threshold vibration level, above which vehicle frame vibrations may be correlated with degraded combustion events. Timeline 700 further includes plot 740, indicating whether the active engine mounts are functioning as desired (yes), or not (no), over time.

At time t0, the engine is indicated to be in operation indicated by plot 705, and thus may be understood to be combusting air and fuel. The vehicle is traveling above a stopped speed, indicated by plot 710. However, conditions are not indicated to be met for conducting an active engine mount diagnostic test procedure, indicated by plot 715. As discussed above, conditions being met may include an engine idle mode, where the engine is on but where the vehicle is not in motion, a static condition, a predetermined period of time elapsing since a prior active engine mount diagnostic procedure, etc. As conditions are not indicated to be met for the active engine mount test diagnostic, fueling to the preselected cylinder is maintained, indicated by plot 725. Accordingly, no degraded combustion events are indicated, illustrated by plot 730. Furthermore, the active engine mounts are configured in the first, damping mode of operation, indicated by plot 720. Thus, the vibrational sensors (and/or inertial sensors) indicate a low level of vibration from the vehicle frame, indicated by plot 735. Still further, at time t0, the active engine mounts are indicated to be functioning as desired. Although the engine mounts may not, in fact be functioning as desired, as will be discussed in more detail below, at time t0, the engine mounts are indicated to be functioning as desired. For example, an active engine mount test diagnostic may not have been conducted since a prior engine mount test diagnostic where the active engine mounts were indicated to be functioning as desired. Thus, at time t0, the active engine mounts are indicated to be functioning as desired.

Between time t0 and t1, the vehicle slows down and comes to a stop with the engine maintained running. Furthermore, at time t1, conditions are indicated to be met for conducting the active engine mount test diagnostic procedure. While not explicitly illustrated, it may be understood that responsive to conditions being met for the active engine mount test diagnostic, a brake pedal (e.g. 156) may be maintained depressed, or wheel brakes may be commanded via the controller to an activated state, where braking force to one or more wheels may be increased. Still further, the vehicle transmission (e.g. 137) may be maintained in drive, or commanded via the controller to drive. Accordingly, at time t1, fueling is cut off to the preselected engine cylinder. More specifically, a command may be sent from the controller to a fuel injector (e.g. 66) configured to deliver fuel to the preselected cylinder, commanding the fuel injector be stopped from delivering fuel to the preselected cylinder. By cutting off fuel injection to the preselected cylinder, degraded combustion events may be induced.

Thus, between time t2 and t3, with the active engine mounts configured in the first, damping mode, vehicle frame vibrations, for example a pattern of vehicle frame vibrations, are recorded. As indicated, three degraded combustion events are indicated between time t2 and t3, however, such an example is illustrative, and more than three degraded combustion events may occur between time t2 and t3. The time period between time t2 and t3 may be understood to comprise the first predetermined time period, as discussed above.

At time t3, the active engine mounts are switched from the first mode, to the second, stiffening mode. Between time t3 and t4, with the active engine mounts configured in the second mode, the pattern of vehicle frame vibrations are recorded by the vehicle controller. Similar to that described above, three degraded combustion events are indicated between time t3 and t4 however there may be more than three degraded combustion events between time t3 and t4. The time period between time t3 and t4 may be understood to comprise the second predetermined time period, as discussed above.

At time t4, the active engine mounts are switched from the second mode, back to the first mode. Between time t3 and t4, with the active engine mounts configured in the second mode, the pattern of vehicle frame vibrations are recorded by the vehicle controller. Similar to that described above, three degraded combustion events are indicated between time t4 and t5 however there may be more than three degraded combustion events between time t4 and t5. The time period between time t4 and t5 may be understood to comprise the third predetermined time period, as discussed above.

Between time t2 and t5, plot 740 is indicated as a dotted line in order to illustrate that the active engine mount test diagnostic procedure is underway, and thus, it is unknown as to whether the active engine mounts are functioning as desired during the time period between time t2 and t5.

At time t5, the active engine mount test diagnostic procedure is complete. In other words, vehicle vibrations have been recorded during the first predetermined time period with the active engine mounts in the first mode, during the second predetermined time period with the active engine mounts in the second mode, and during the third predetermined time period with the active engine mounts in the first mode. Accordingly, the vehicle controller may query a lookup table in order to determine whether the active engine mounts are functioning as desired. As discussed above, such a lookup table may comprise lookup table 600 depicted at FIG. 6. The vehicle controller may process data corresponding to degraded combustion events, and data recorded via the vibrational sensors (and/or inertial sensors), in order to determine whether degraded combustion events are correlated with data recorded from the vibrational sensors. In example timeline 700, data recorded from the vibrational sensors, corresponding to individual degraded combustion events, is above the threshold vibration level in each of the first predetermined time duration, the second predetermined time duration, and the third predetermined time duration. Thus, it may be understood that in the first predetermined time duration, and the third predetermined time duration, degraded combustion events are not effectively dampened via the active engine mounts configured in the first mode. Instead, the recorded vibrations in the first predetermined time duration, second predetermined time duration, and third predetermined time duration, are all indicated to be correlated with degraded combustion events. As such, the results of the active engine mount test diagnostic are consistent with outcome C, described above with regard to FIG. 6. More specifically, it may be determined that the active engine mounts are stuck in the second mode (e.g. stiffening mode). While example timeline depicts a condition where the active engine mounts are stuck in the second mode, other example outcomes, such as outcome A or B, discussed above with regard to FIG. 6, may be indicated under conditions where the active engine mounts are indicated to be functioning as desired (e.g. outcome A), or responsive to an indication that active engine mounts are stuck in the first mode (e.g. outcome B).

Accordingly, at time t5, it is indicated that the active engine mounts are not functioning as desired, indicated by plot 740. Responsive to the indication that the active engine mounts are not functioning as desired, a flag may be set at the controller, and a malfunction indicator light (MIL) may be illuminated to notify the vehicle operator (where present) of the need to service the vehicle. Furthermore, as the first through third predetermined time periods corresponding to the active engine mount test diagnostic procedure are indicated to be complete, conditions are no longer indicated to be met for conducting the active engine mount test diagnostic, illustrated by plot 715. With conditions no longer being met for conducting the active engine mount test diagnostic, fueling to the preselected cylinder is enabled to resume. For example, the controller may command the fuel injector configured to provide fuel to the preselected cylinder to resume injection of fuel. Between time t5 and t6, the vehicle resumes traveling, indicated by plot 710.

In this way, an active engine mount test diagnostic procedure may be conducted on a vehicle during an idle stop. In some examples, the test may be conducted on an autonomously driven vehicle such that a diagnosis may be made as to whether the active engine mounts are functioning as desired, even under circumstances where a vehicle operator or other passengers may not be present. However, such an example is not meant to be limiting, and the active engine mount test diagnostic may additionally or alternatively be conducted on vehicles not configured for autonomous driving, such as regular gasoline (or other fuel blend) vehicles, hybrid electric vehicles, plug-in hybrid electric vehicles, etc.

The technical effect is to recognize that for vehicles with actively controllable engine mounts, under static conditions such as engine idle conditions, engine vibrations may readily be induced by shutting off fueling to a preselected engine cylinder. With the engine vibrations induced via shutting off fueling to the preselected cylinder, vehicle chassis vibrations may be monitored under conditions where the induced vibrations are expected to be dampened, and under conditions where the induced vibrations are not expected to be dampened. By monitoring for whether the induced vibrations are dampened, or not, while controlling the active engine mounts to both dampening modes and stiffening modes, it may be determined as to whether the active engine mounts are functioning as desired, are stuck in the dampening mode, or are stuck in the stiffening mode. By periodically determining whether the active engine mounts are functioning as desired, vehicle system complications arising from active engine mounts that are not functioning as desired may be reduced.

In one example, a method may include indicating degradation of an active engine mount by inducing degraded combustion events in a preselected engine cylinder, and operating the active engine mount in multiple modes, the indication responsive to chassis vibration during each of the modes. The systems described herein, and with reference to FIGS. 1-4, along with the methods described herein and with reference to FIG. 5, may enable one or more systems and one or more methods. In one example, a method comprises during propelling a vehicle at least in part by an engine, isolating engine vibration from a cabin and chassis of the vehicle via one or more active engine mounts controllable to a first mode and a second mode; and in a first condition, increasing engine vibrations and controlling the active engine mounts to the first mode and the second mode to diagnose whether the active engine mounts are functioning as desired. In a first example of the method, the method further comprises providing fuel to one or more engine cylinders via controlling one or more fuel injectors during propelling the vehicle at least in part by the engine; and wherein inducing engine vibrations includes shutting off fueling to a preselected engine cylinder to induce degraded combustion in the preselected engine cylinder. A second example of the method optionally includes the first example, and further includes wherein increasing engine vibrations and controlling the active engine mounts in the first condition is conducted responsive to preconditions being met, where the preconditions include one or more of an indication of an engine idle condition, and a duration of time elapsing since a prior active engine mount diagnostic. A third example of the method optionally includes any one or more or each of the first and second examples, and further comprises in the first condition, commanding or maintaining application of one or more wheel brakes, and commanding or maintaining a vehicle transmission in a drive mode.

A fourth example of the method optionally includes any one or more or each of the first through third examples and further includes wherein the first mode includes a dampening mode of active engine mount operation, and where the second mode includes a stiffening mode of active engine mount operation. A fifth example of the method optionally includes any one or more or each of the first through fourth examples and further includes wherein controlling the active engine mounts to the first mode and the second mode includes commanding the active engine mounts to the first mode for a first predetermined time duration; commanding the active engine mounts to the second mode for a second predetermined time duration after completion of the first predetermined time duration; and commanding the active engine mounts to the first mode for a third predetermined time duration after completion of the second predetermined time duration. A sixth example of the method optionally includes any one or more or each of the first through fifth examples and further includes wherein the first condition further comprises: monitoring the increased vibrations via one or more vibrational sensors configured to sense vibrations stemming from the vehicle cabin and the vehicle chassis responsive to increasing engine vibrations. A seventh example of the method optionally includes any one or more or each of the first through sixth examples and further comprises determining whether vibrations stemming from the vehicle cabin and chassis as monitored via the one or more vibrational sensors correlate with the increased vibrations during controlling the active engine mounts to the first mode and the second mode during the first condition; indicating the active engine mounts are functioning as desired responsive to monitored vibrations not correlating with increased vibrations in the first mode, but where monitored vibrations are correlated with the increased vibrations in the second mode; indicating the active engine mounts are stuck in the first mode responsive to monitored vibrations not correlating with the increased vibrations in the first mode, and where monitored vibrations are not correlated with the increased vibrations in the second mode; and indicating the active engine mounts are stuck in the second mode responsive to monitored vibrations correlating with the increased vibrations in the first mode, and where monitored vibrations are also correlated with the increased vibrations in the second mode. An eighth example of the method optionally includes any one or more or each of the first through seventh examples and further includes wherein determining whether vibrations stemming from the vehicle cabin and chassis as monitored via the one or more vibrational sensors correlate with the increased vibrations further comprises: indicating that the vibrations monitored via the one or more vibrational sensors correlate with the increased vibrations responsive to the monitored vibrations being above a threshold vibration level within a time threshold of the increased vibrations.

An example of a system comprises an engine with one or more engine cylinders; one or more active engine mounts configured to isolate engine vibrations from a vehicle chassis and a vehicle cabin, and controllable to a first, dampening mode, and a second, stiffening mode; one or more vibrational sensors configured to monitor vehicle chassis and cabin vibration; and a controller storing instructions in non-transitory memory, that when executed, cause the controller to: responsive to an indication that preconditions for an active engine mount test diagnostic procedure are met: actively induce degraded combustion events in a preselected engine cylinder; command the one or more active engine mounts to the dampening mode for a first predetermined time duration, command the one or more active engine mounts to the stiffening mode for a second predetermined time duration, and command the one or more active engine mounts to the dampening mode for a third predetermined time duration while degraded combustion events are occurring in the preselected engine cylinder; monitor vibrations via the one or more vibrational sensors during the first predetermined time period, during the second predetermined time period, and the third predetermined time period; and indicate that the active engine mounts are functioning as desired responsive to vibrations as monitored via the one or more vibrational sensors being dampened below a vibration threshold during the first predetermined time period and the third predetermined time period, but not during the second predetermined time period. In a first example, the system further includes wherein the controller further stores instructions in non-transitory memory, that when executed, cause the controller to: indicate that the active engine mounts are stuck in the first, dampening mode, responsive to vibrations as monitored via the one or more vibrational sensors being dampened below the vibration threshold during each of the first, second, and third predetermined time periods; and indicate that the active engine mounts are stuck in the second, stiffening mode, responsive to vibrations as monitored via the one or more vibrational sensors being above the vibration threshold during each of the first, second, and third predetermined time periods. A second example of the system optionally includes the first example, and further comprises one or more fuel injectors configured to deliver fuel to the one or more engine cylinders; and wherein the controller further stores instructions in non-transitory memory, that when executed, cause the controller to: command a fuel injector configured to deliver fuel to the preselected cylinder to stop injection of fuel to actively induce degraded combustion events in the preselected engine cylinder. A third example of the system optionally includes any one or more or each of the first and second examples, and further includes wherein preconditions for the active engine mount test diagnostic procedure being met include one or more of an engine idle condition, and a duration of time elapsing since a prior active engine mount diagnostic. A fourth example of the system optionally includes any one or more or each of the first through third examples and further comprises an antilock brake system for increasing or decreasing hydraulic pressure to one or more vehicle wheel brakes; a transmission; and wherein the controller further stores instructions in non-transitory memory, that when executed, cause the controller to: responsive to an indication that preconditions for an active engine mount test diagnostic procedure are met: command or maintain application of the wheel brakes; and command the transmission to a drive mode of operation.

Another example of a method comprises during propelling an autonomous vehicle at least in part via an engine, isolating engine vibration from a cabin and chassis of the vehicle via one or more active engine mounts controllable to at least a dampening mode and a stiffening mode; and responsive to predetermined conditions for an active engine mount test diagnostic procedure being met: actively inducing a plurality of degraded combustion events to increase engine vibration; controlling the active engine mounts to the dampening mode, followed by the stiffening mode, and then returning the active engine mounts to the dampening mode while the degraded combustion events are occurring; and indicating whether the active engine mounts are functioning as desired, are stuck in the dampening mode, or are stuck in the stiffening mode. In a first example of the method, the method further comprises monitoring chassis and cabin vibration via one or more vibrational sensors while the engine mounts are controlled to the dampening and stiffening modes, and where the monitored vibrations include vibrations due to the degraded combustion events; and indicating that the active engine mounts are functioning as desired responsive to the monitored vibrations being dampened below a vibration threshold during each of the dampening modes, but where monitored vibrations are above the vibration threshold during the stiffening mode. A second example of the method optionally includes the first example and further comprises indicating that the active engine mounts are stuck in the dampening mode responsive to the monitored vibrations being dampened below the vibration threshold during each of the dampening modes, and the stiffening mode; and indicating that the active engine mounts are stuck in the stiffening mode responsive to the monitored vibrations being above the vibration threshold in each of the dampening modes, or the stiffening mode. A third example of the method optionally includes any one or more or each of the first and second examples and further comprises commanding or maintaining application of one or more wheel brakes, and commanding or maintaining a vehicle transmission in a drive mode responsive to the predetermined conditions for an active engine mount test diagnostic procedure being met. A fourth example of the method optionally includes any one or more or each of the first through third examples and further includes wherein the predetermined conditions include one or more of an indication of an engine idle condition, and a duration of time elapsing since a prior active engine mount diagnostic. A fifth example of the method optionally includes any one or more or each of the first through fourth examples and further comprises providing fuel to one or more engine cylinders via one or more fuel injectors configured to deliver fuel to the one or more engine cylinders; and wherein actively inducing the plurality of degraded combustion events to induce engine vibration includes stopping fuel injection to a preselected cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
during propelling a vehicle at least in part by an engine, isolating engine vibration from a cabin and chassis of the vehicle via one or more active engine mounts controllable to a first, dampening, mode and a second, stiffening, mode via a controller; and
conducting an engine mount diagnostic via increasing engine vibrations and controlling the active engine mounts to the first mode and the second mode via the controller to diagnose whether the active engine mounts are functioning as desired.

2. The method of claim 1, further comprising:
providing fuel to one or more engine cylinders via controlling one or more fuel injectors during propelling the vehicle at least in part by the engine; and
wherein inducing engine vibrations includes shutting off fueling to a preselected engine cylinder to induce degraded combustion in the preselected engine cylinder.

3. The method of claim 1, wherein increasing engine vibrations and controlling the active engine mounts for conducting the engine mount diagnostic is conducted responsive to preconditions being met, where the preconditions include one or more of an indication of an engine idle condition, and a duration of time elapsing since a prior active engine mount diagnostic.

4. The method of claim 1, further comprising:
for conducting the engine mount diagnostic, commanding or maintaining application of one or more wheel brakes, and commanding or maintaining a vehicle transmission in a drive mode.

5. The method of claim 1, wherein controlling the active engine mounts to the first mode and the second mode includes:
commanding the active engine mounts to the first mode for a first predetermined time duration;
commanding the active engine mounts to the second mode for a second predetermined time duration after completion of the first predetermined time duration; and
commanding the active engine mounts to the first mode for a third predetermined time duration after completion of the second predetermined time duration.

6. The method of claim 1, wherein conducting the engine mount diagnostic further comprises:
monitoring the increased vibrations via one or more vibrational sensors configured to sense vibrations stemming from the vehicle cabin and the vehicle chassis responsive to increasing engine vibrations.

7. The method of claim 6, further comprising:
determining whether vibrations stemming from the vehicle cabin and chassis as monitored via the one or more vibrational sensors correlate with the increased vibrations during controlling the active engine mounts to the first mode and the second mode during the conducting the engine mount diagnostic;
indicating the active engine mounts are functioning as desired responsive to monitored vibrations not correlating with increased vibrations in the first mode, but where monitored vibrations are correlated with the increased vibrations in the second mode;
indicating the active engine mounts are stuck in the first mode responsive to monitored vibrations not correlating with the increased vibrations in the first mode, and where monitored vibrations are not correlated with the increased vibrations in the second mode; and
indicating the active engine mounts are stuck in the second mode responsive to monitored vibrations correlating with the increased vibrations in the first mode, and where monitored vibrations are also correlated with the increased vibrations in the second mode.

8. The method of claim 7, wherein determining whether vibrations stemming from the vehicle cabin and chassis as monitored via the one or more vibrational sensors correlate with the increased vibrations further comprises:
indicating that the vibrations monitored via the one or more vibrational sensors correlate with the increased vibrations responsive to the monitored vibrations being above a threshold vibration level within a time threshold of the increased vibrations.

9. A system for a vehicle comprising:
an engine with one or more engine cylinders;
one or more active engine mounts for isolating engine vibrations from a vehicle chassis and a vehicle cabin, and controllable to a first, dampening mode, and a second, stiffening mode;
one or more vibrational sensors configured to monitor vehicle chassis and cabin vibration; and
a controller storing instructions in non-transitory memory, that when executed, cause the controller to:
responsive to an indication that preconditions, including an engine idle condition and/or a duration of time elapsing since a prior active engine mount diagnostic, for an active engine mount test diagnostic procedure are met:
actively induce degraded combustion events in a preselected engine cylinder;
command the one or more active engine mounts to the first, dampening mode for a first predetermined time duration, command the one or more active engine mounts to the second, stiffening mode for a second predetermined time duration, and command the one or more active engine mounts to the first, dampening mode for a third predetermined time duration while degraded combustion events are occurring in the preselected engine cylinder;
monitor vibrations via the one or more vibrational sensors during the first predetermined time duration, during the second predetermined time duration, and the third predetermined time duration; and
indicate that the active engine mounts are functioning as desired responsive to vibrations as monitored via the one or more vibrational sensors being dampened below a vibration threshold during the first predetermined time duration and the third predetermined time duration, but not during the second predetermined time duration.

10. The system of claim 9, wherein the controller further stores instructions in non-transitory memory, that when executed, cause the controller to:
indicate that the active engine mounts are stuck in the first, dampening mode, responsive to vibrations as monitored via the one or more vibrational sensors being dampened below the vibration threshold during each of the first, second, and third predetermined time durations; and
indicate that the active engine mounts are stuck in the second, stiffening mode, responsive to vibrations as monitored via the one or more vibrational sensors being above the vibration threshold during each of the first, second, and third predetermined time durations.

11. The system of claim 9, further comprising:
one or more fuel injectors configured to deliver fuel to the one or more engine cylinders; and
wherein the controller further stores instructions in non-transitory memory, that when executed, cause the controller to:
command a fuel injector configured to deliver fuel to the preselected engine cylinder to stop injection of fuel to actively induce degraded combustion events in the preselected engine cylinder.

12. The system of claim 9, further comprising:
an antilock brake system for increasing or decreasing hydraulic pressure to one or more vehicle wheel brakes;
a transmission; and
wherein the controller further stores instructions in non-transitory memory, that when executed, cause the controller to:
responsive to an indication that preconditions for an active engine mount test diagnostic procedure are met:
command or maintain application of the wheel brakes; and
command the transmission to a drive mode of operation.

13. A method comprising:
during propelling an autonomous vehicle at least in part via an engine, isolating engine vibration from a cabin and chassis of the vehicle via one or more active engine mounts controllable via a controller to at least a dampening mode and a stiffening mode; and responsive to predetermined conditions for an active engine mount test diagnostic procedure being met, where the predetermined conditions include one or more of an indication of an engine idle condition and/or a duration of time elapsing since a prior active engine mount diagnostic;

actively inducing, via the controller, a plurality of degraded combustion events to increase engine vibration;

controlling, via the controller, the active engine mounts to the dampening mode, followed by the stiffening mode, and then returning, via the controller, the active engine mounts to the dampening mode while the degraded combustion events are occurring; and indicating, via the controller, whether the active engine mounts are functioning as desired, are stuck in the dampening mode, or are stuck in the stiffening mode.

14. The method of claim 13, further comprising:
monitoring chassis and cabin vibration via one or more vibrational sensors while the active engine mounts are controlled to the dampening and stiffening modes, and where the monitored vibrations include vibrations due to the degraded combustion events; and indicating that the active engine mounts are functioning as desired responsive to the monitored vibrations being dampened below a vibration threshold during each of the dampening modes, but where monitored vibrations are above the vibration threshold during the stiffening mode.

15. The method of claim 14, further comprising:
indicating that the active engine mounts are stuck in the dampening mode responsive to the monitored vibrations being dampened below the vibration threshold during each of the dampening modes, and the stiffening mode; and indicating that the active engine mounts are stuck in the stiffening mode responsive to the monitored vibrations being above the vibration threshold in each of the dampening modes, or the stiffening mode.

16. The method of claim 13, further comprising:
commanding or maintaining application of one or more wheel brakes, and commanding or maintaining a vehicle transmission in a drive mode responsive to the predetermined conditions for the active engine mount test diagnostic procedure being met.

17. The method of claim 13, further comprising:
providing fuel to one or more engine cylinders via one or more fuel injectors configured to deliver fuel to the one or more engine cylinders; and wherein actively inducing the plurality of degraded combustion events to induce engine vibration includes stopping fuel injection to a preselected cylinder.

* * * * *